(12) United States Patent
Proksch et al.

(10) Patent No.: US 7,861,315 B2
(45) Date of Patent: Dec. 28, 2010

(54) METHOD FOR MICROFABRICATING A PROBE WITH INTEGRATED HANDLE, CANTILEVER, TIP AND CIRCUIT

(75) Inventors: Roger Proksch, Santa Barbara, CA (US); Hector Cavazos, Santa Barbara, CA (US)

(73) Assignee: Asylum Research Corporation, Goleta, CA (US)

( * ) Notice: Subject to any disclaimer, the term of this patent is extended or adjusted under 35 U.S.C. 154(b) by 10 days.

(21) Appl. No.: 12/316,287

(22) Filed: Dec. 11, 2008

(65) Prior Publication Data

US 2009/0178166 A1 Jul. 9, 2009

Related U.S. Application Data

(60) Provisional application No. 61/007,368, filed on Dec. 11, 2007.

(51) Int. Cl.
*G01N 23/00* (2006.01)
(52) U.S. Cl. .............. 850/41; 850/40; 850/53; 977/863; 977/873
(58) Field of Classification Search .......... 850/40, 850/41, 53; 73/105; 250/306, 307; 977/863, 977/873
See application file for complete search history.

(56) References Cited

U.S. PATENT DOCUMENTS

| | | | | | |
|---|---|---|---|---|---|
| 5,221,415 | A | * | 6/1993 | Albrecht et al. | 216/2 |
| 5,345,815 | A | * | 9/1994 | Albrecht et al. | 73/105 |
| 5,399,232 | A | * | 3/1995 | Albrecht et al. | 216/2 |
| 5,883,705 | A | * | 3/1999 | Minne et al. | 355/71 |
| 5,959,200 | A | * | 9/1999 | Chui et al. | 73/105 |
| 6,075,585 | A | * | 6/2000 | Minne et al. | 355/71 |
| 7,617,736 | B2 | * | 11/2009 | Tang et al. | 73/777 |
| 2008/0216583 | A1 | * | 9/2008 | Bargatin et al. | 73/777 |
| 2009/0038404 | A1 | * | 2/2009 | Tang et al. | 73/777 |

* cited by examiner

*Primary Examiner*—Jack I Berman
*Assistant Examiner*—Michael Maskell
(74) *Attorney, Agent, or Firm*—The Marbury Law Group PLLC

(57) ABSTRACT

A simple method for integrating a circuit onto a probe with a handle, a cantilever and a tip is provided. By fabricating a probe whose surface has recessed patterns of the desirable profile, a circuit can be formed on one part of the handle out over the cantilever and back onto a different part of the handle without employing a circuit lithography step. The circuit material constituting the circuit is deposited orthogonally to the probe surface with a line-of-sight technique.

26 Claims, 6 Drawing Sheets

METHOD FOR MICROFABRICATING A PROBE WITH INTEGRATED HANDLE, CANTILEVER, TIP AND CIRCUIT

The present application claims priority to U.S. provisional patent application Ser. No. 61/007,368 filed on Dec. 11, 2007.

REFERENCES CITED

U.S. Patent Documents

| | | |
|---|---|---|
| 5,221,415 | June 1993 | Albrecht et al. |
| 5,345,815 | September 1994 | Albrecht et al. |
| 5,399,232 | March 1995 | Albrecht et al. |
| 5,580,827 | December 1996 | Akamine |
| 5,883,705 | March 1999 | Minne et al. |
| 6,642,129 | November 2003 | Liu et al. |
| 6,862,923 | March 2005 | Buguin et al. |

Other Publications

BACKGROUND OF THE INVENTION

This invention relates to the microfabrication of a circuit path on probes for use in probe-based instruments, and more particularly, to methods to integrate a simple circuit path from a probe handle and over the cantilever and back. It also relates to applications where sensing or initiating a mechanical response in the probe is made via the probe's integrated circuit.

For the sake of convenience, the current description focuses on probes that may be realized for a particular embodiment of probe-based instruments, the atomic force microscope (AFM). Probe-based instruments include such instruments as AFMs, 3D molecular force probe instruments, high-resolution profilometers (including mechanical stylus profilometers), surface modification instruments, chemical or biological sensing probes, and micro-actuated devices. The probes described herein may be realized for such other probe-based instruments.

An AFM is an instrument used to produce images of surface topography (and/or other sample characteristics) based on information obtained from scanning (e.g., rastering) a probe relative to the surface of the sample. Probes consist of a handle by which the probe is fastened to the frame of the AFM, a cantilever extending from the handle and a sharp tip at the end of the cantilever. Topographical and/or other features of the surface are detected by sensing changes in the probe's mechanical response to surface features and using feedback to return the system to a reference state. By scanning the probe relative to the sample, a "map" of the sample topography or other sample characteristics may be obtained.

Changes in the probe's mechanical response are typically detected by an optical lever arrangement whereby a light beam is directed onto the cantilever in the same reference frame as the optical lever. The beam reflected from the cantilever illuminates a position sensitive detector (PSD). As the probe's mechanical response changes, a change in the output from the PSD is induced. These changes in the PSD signal are typically used to trigger a change in the vertical position of the base of the probe relative to the sample (referred to herein as a change in the Z position, where Z is generally orthogonal to the XY plane defined by the sample), in order to maintain a constant pre-set value for one or more of the probe's mechanical responses. It is this feedback that is typically used to generate an AFM image.

AFMs can be operated in a number of different sample characterization modes, including contact mode where the tip of the probe is in constant contact with the sample surface, and AC modes where the tip makes no contact or only intermittent contact with the surface. AC modes are typically achieved by mechanically coupling the probe to a piezo-electric element which shakes the probe at a desired frequency, commonly the resonant frequency of the cantilever. These two modes define two mechanical responses of the probe that can be used in the feedback loop which allow the user to set a probe-based operational parameter for system feedback.

In contact mode the interaction between the probe and the sample surface induces a discernable effect on a probe-based operational parameter, such as the cantilever deflection. In AC mode the effects of interest include the cantilever oscillation amplitude, the phase of the cantilever oscillation relative to the signal driving the oscillation and the frequency of the cantilever oscillation. All of these probe-based operational parameters are detectable by a PSD and the resultant PSD signal is used as a feedback control signal for the Z actuator to maintain the designated probe-based operational parameter constant.

The feedback control signal also provides a measurement of the sample characteristic of interest. For example, when the designated parameter in an AC mode is oscillation amplitude, the feedback signal may be used to maintain the amplitude of cantilever oscillation constant to measure changes in the height of the sample surface or other sample characteristics.

Probes are micro-electrical mechanical systems (MEMS) microfabricated by using semiconductor fabrication techniques as this provides a way to batch produce probes with consistent cantilever and tip geometries necessary for use with AFMs today. These techniques include, but are not limited to: thin film deposition, photolithography with optical masks, Reactive Ion Etching (RIE) with plasma, anisotropic wet etching of silicon, and wafer-to-wafer bonding. Silicon and silicon nitride are the two primary semiconductor materials from which AFM probes are fabricated; silicon probes tend to have higher resonant frequencies and higher force constants than silicon nitride probes.

Relatively little development has gone into the advancement of probe technology as compared to other components of AFMs. Many thin films that have been deposited on standard probes that have increased performance or added some functionality, but the basic AFM probe technology remained. Probes have become a bottleneck in the overall advancement of AFM technology.

The life sciences have become an important application for the AFM. Frequently this requires a fluid environment. Using AC modes in such an environment poses challenges because the piezo-electric element, commonly used as the oscillator, can short out in fluid. To overcome this challenge, the holder of the probe, and therefore the cantilever and the tip, together with the fluid have all been shaken, with the piezo-electric element isolated from the fluid. However, image quality and stability have greatly suffered with this configuration because the cantilever's true resonance is hidden in a myriad of resonances coupled to the cantilever via the fluid. AC mode in fluid would perform better if only the cantilever were oscillating and not the holder of the probe and the fluid.

More generally the current technology suffers from the fact that the piezo-electric element, commonly used as the oscillator, operates mechanically. Since the piezo-electric element is coupled to the AFM its operation causes unwanted vibrations that translate to noise in the images produced by the AFM. As probes get smaller and faster in order to decrease imaging time, this will become an even bigger issue. AC mode would perform better, and with a lower noise floor, if the probe could be actuated without being coupled to a mechanical actuator.

Efforts have long been made to improve upon the optical lever arrangement whereby a light beam is directed onto the cantilever and reflected from the cantilever to illuminate a PSD. The optical lever arrangement has proved to be a useful technology, but it has disadvantages. The user must realign the laser on the probe or realign the PSD, or both every time a probe is replaced. Furthermore, the optical lever arrangement requires a complicated apparatus consisting of a light source (typically a laser), a PSD, lenses and electronics which complicates the AFM and limits its usefulness in some applications. AFMs could be greatly improved if the probe's mechanical response could be detected by the probe itself without the use of the optical lever.

SUMMARY OF THE INVENTION

An improved AFM would result from a probe with a circuit that starts on the handle and then extends out over the cantilever and back to the handle. The AC mode noise floor of the AFM can be lowered by removing the piezo-electric mechanical actuator and utilizing probe actuation via thermal mechanical forces or magnetic forces (e.g. Lorentz forces) across the loop circuit of such a probe. Both actuation techniques would require electric current directed through the loop circuit to oscillate the probe. The former technique would do so with a heat transfer bimorph affect and the latter would require a static magnetic field oriented in the optimal direction with respect to the end of the cantilever. Both of these actuation techniques greatly improve AC mode fluid imaging because they dispense with the coupled mechanical actuator in the prior art which causes unwanted resonances in the fluid and probe holder. Also, it may be possible to develop a smaller and easy-to-use AFM without the constraining optical lever arrangement by using the probe's simple loop circuit as a strain gauge to determine its mechanical response.

It is therefore an object of the invention to provide a method for fabricating an AFM probe with an integrated circuit whereby a line-of-sight deposited circuit material on a desirable probe surface defines the circuit.

DETAILED DESCRIPTION OF THE PREFERRED EMBODIMENTS

The invention described herein includes several steps starting with forming a tip mold on a silicon substrate. A process could be applied to the substrate to sharpen the tip mold if desired. A suitable thin film is deposited on the substrate and formed into a two-legged cantilever, tip and handle-mount, with the handle-mount in two separate pieces, one piece connecting to one leg of the cantilever and the other piece to the other leg. These formed edges should have vertical (or near-vertical) sidewalls. A handle is attached to the two handle-mount pieces on the substrate. The substrate is selectively removed until the tip and cantilever are exposed. A line-of-sight deposition of a circuit material, whose thickness is less than the thickness of the thin film, is applied to the tip-side. The result is a circuit that starts on one of the handle pieces, extends out over the cantilever, and then back to the other handle piece.

Figure 1A:
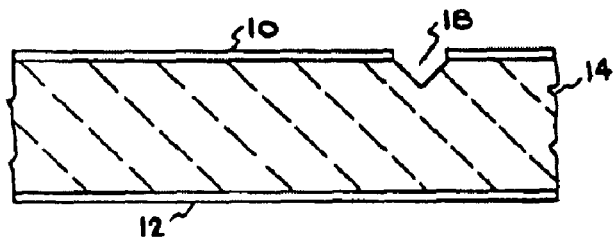
FIGS. 1A-E illustrate a prior art method for microfabricating a probe.
Figure 1B:
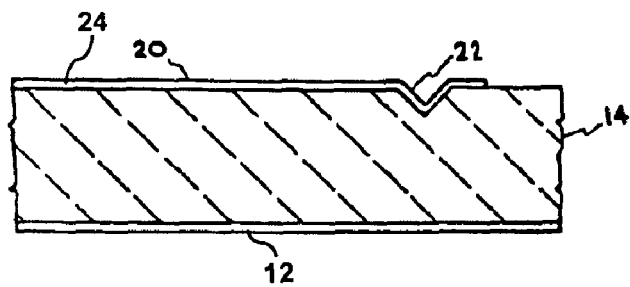
Figure 1C:
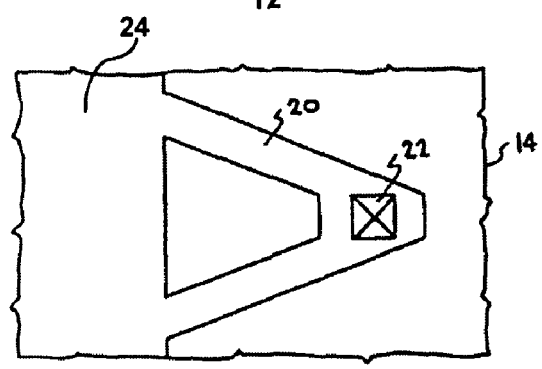
Figure 1D:
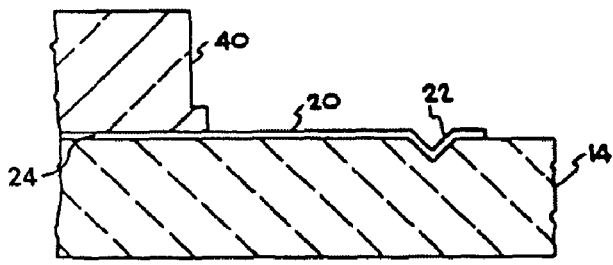
Figure 1E:
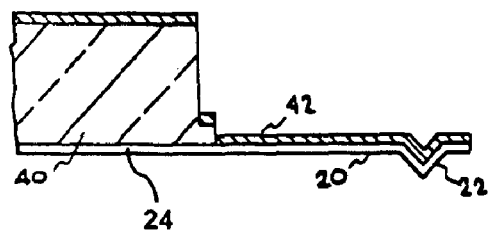
Figure 2A:
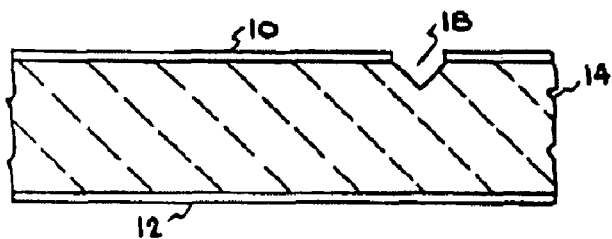
FIGS. 2A to 2B are cross-sectional views illustrating the microfabrication of an integrated tip and cantilever molded on a conventional silicon substrate.

FIGS. 2A to 2E illustrate a typical state-of-the-art probe microfabrication process modified to incorporate the invention described herein. FIG. 2A illustrates a (100) silicon substrate 14 with an inverted tip 18 formed into it. The process starts with growing thermal oxide thin films 10 and 12 (or depositing any other suitable film) on both sides of the silicon substrate 14. The thin film 10 is also used as an etch mask for selectively etching the inverted tip into the silicon substrate 14 by forming an opening in the thin film via standard semiconductor lithographic processes. The inverted tip 18 is anisotropically wet etched into the silicon substrate 14 bounded by four (111) crystallographic planes terminating at a point. Though optional and not illustrated, these planes may be made more convex via a tip sharpening process involving growing a thermal oxide layer according to U.S. Pat. No. 5,580,827, Casting Sharpened Microminiature Tips.

Figure 2B:
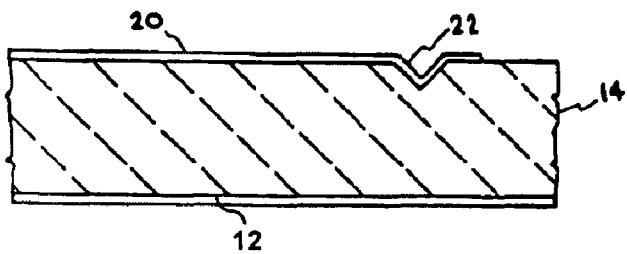

FIG. 2B illustrates a thin film deposition on the silicon substrate 14 after removal of the thermal oxide thin film 10 shown in FIG. 2A. In one embodiment of the invention the thin film is low stress silicon nitride deposited via chemical vapor deposition, however any suitable thin film can be used. The thin film is formed via standard semiconductor lithographic processes into a cantilever 20, tip 22 and two-piece handle-mount 26 and 28 (shown in FIG. 2C), which are aligned with the tip mold 18 shown in FIG. 2A.

Figure 2C:
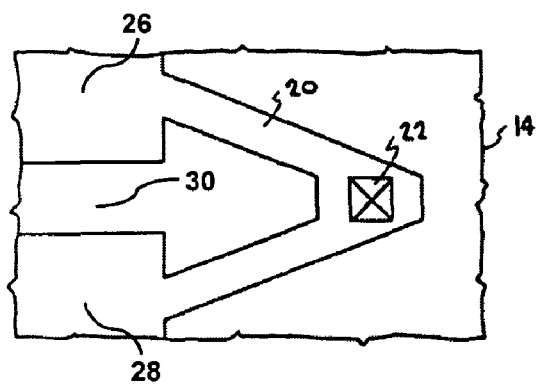
FIG. 2C is a plan view of the silicon substrate showing a two-piece handle-mount, with one handle-mount connecting to one leg of the cantilever and the other handle-mount connecting to the other leg.

FIG. 2C is a plan view of the thin film deposition and its lithographic formation of FIG. 2B showing the two-piece handle mount 26 and 28 and the cantilever 20 and tip 22 on the silicon substrate 14. The lithographic processes form two separate handle-mount pieces 26 and 28, the space between them being designated by 30.

Figure 2D:
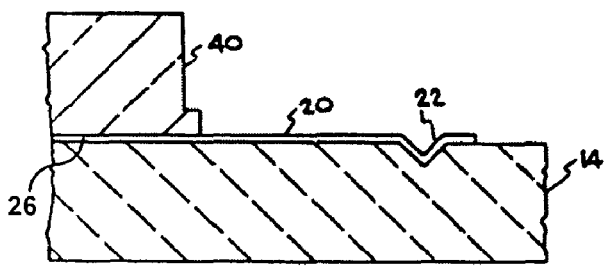
FIG. 2D is a cross-sectional view showing the formed tip and cantilever after anodic bonding of the handle-mounts to a glass block, referred to as the handle.

FIG. 2D illustrates a borosilicate glass block 40, which serves as the handle of the probe, attached to the handle-mounts 26 and 28 on the silicon substrate 14. For convenience, the handle-mount shown is 26, but the cross-sectional view would be the same were it viewed from the other side, in which case the handle mount would be 28. The glass block 40 is anodically bonded to the handle-mounts 26 and 28 on the silicon substrate 14.

Figure 2E:
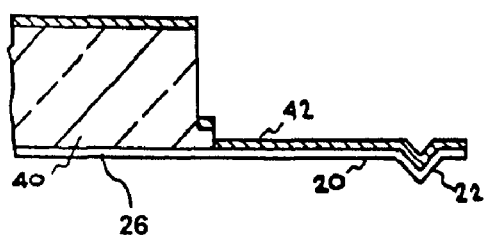
FIG. 2E is a cross-sectional view of the integrated handle, cantilever, and tip after selectively etching the silicon substrate and depositing a reflective material on the back opposite the tip.
Figure 3A:
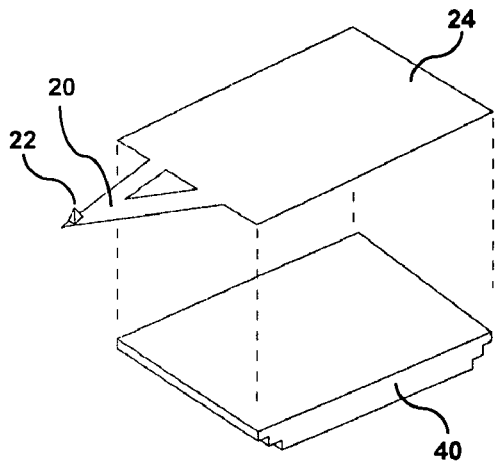
FIGS. 3A-B illustrate a prior art method for microfabricating a probe.
Figure 3B:
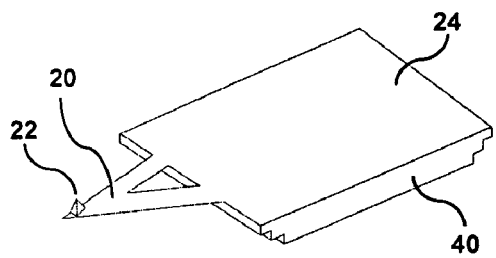

FIG. 2E illustrates the probe with topography desirable for depositing a circuit material with handle 40, cantilever 20, and tip 22. The silicon substrate 14 has been selectively etched away to reveal the cantilever 20, tip 22 and the handle mounts 26 and 28 to which the handle 40 is attached. This is followed by the deposition of gold film 42 (or any other suitable reflective material) on the back of the cantilever (the side opposite the tip 22) to enhance the optical lever signal.

Figure 4A:
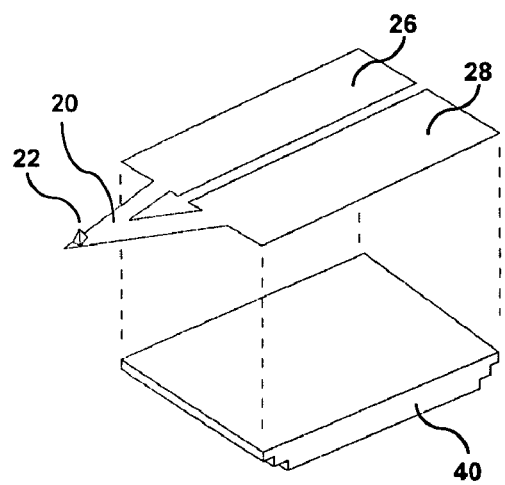
FIGS. 4A and 4B are perspective views illustrating the layers that are bonded together to form a probe with topography desirable for depositing a circuit material.
Figure 4B:
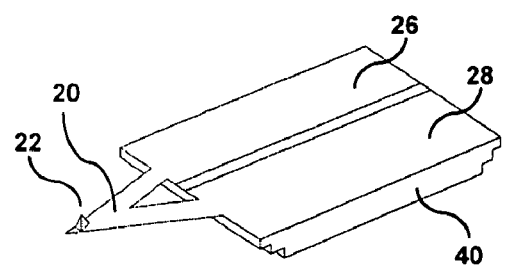
Figure 5A:
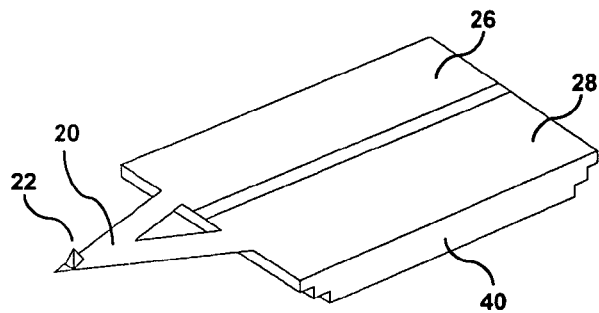
FIGS. 5A to 5D are successive zoom perspective views from the tip-side of a probe with desirable topography prior to depositing the circuit material.
Figure 5B:
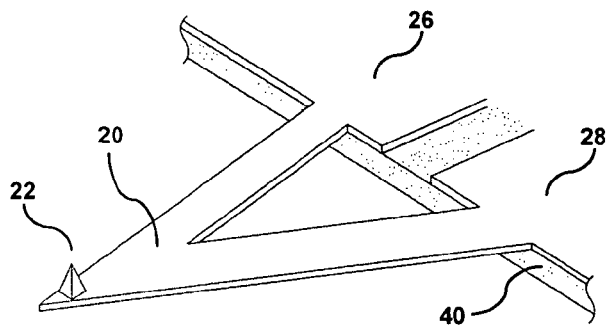
Figure 5C:
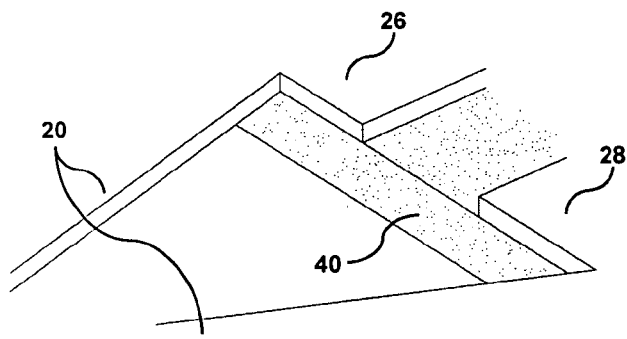
Figure 5D:
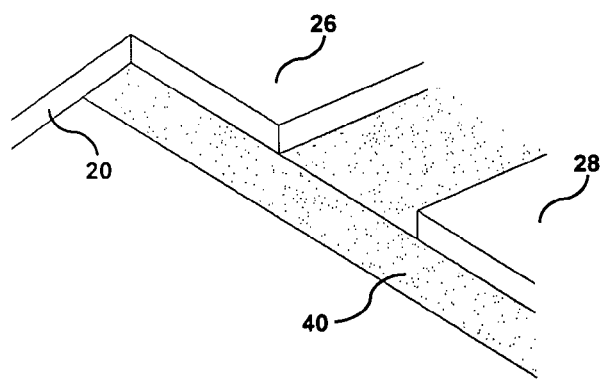

FIGS. 4A and 4B illustrate a perspective view of the thin film probe layer, including the handle 40, cantilever 20, and tip 22, and borosilicate glass block 40 bonded together to form a probe with topography desirable for depositing a circuit material.

FIGS. 5A to 5D show successive zooms of a perspective view of the cantilever 20, tip 22, handle-mounts 26 and 28 and handle 40 as an aid to understanding the results of the microfabrication process to this point.

Figure 6A:
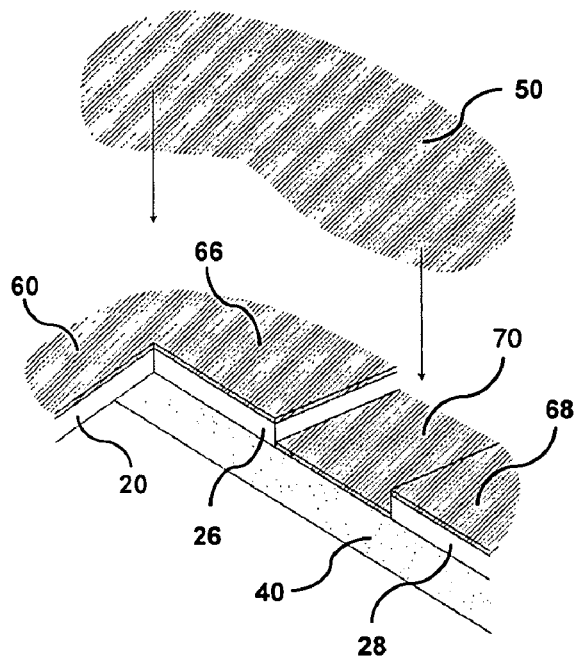
FIG. 6A is a tip-side perspective view of the circuit material being deposited orthogonal to the plane of the probe handle and cantilever.
Figure 6B:
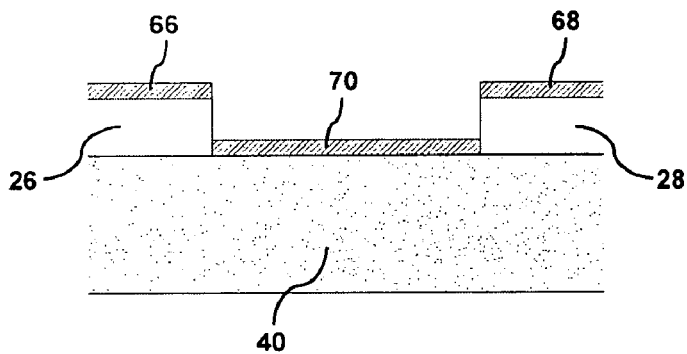
FIG. 6B is a cross-sectional view of the probe handle centered between the two handle-mounts after the circuit material has been deposited.

FIG. 6A depicts the circuit material 50 being orthogonally deposited on the tip-side surfaces of the handle-mounts 26 and 28, handle 40 and cantilever 20 (not shown) in a line-of-sight fashion. In one embodiment of the invention, the circuit material is gold and the deposition technique is evaporation, but other circuit materials and deposition techniques known to those skilled in the art could be used. FIG. 6B illustrates that the thickness of the circuit material 70 deposited on the handle 40 between the handle-mounts 26 and 28 of the probe must be less than the wall height of these mounts. If not, the circuit material 70 landing on the handle 40 may be thick enough to make contact with the circuit material 66 and 68 landing on the handle mounts 26 and 28, respectively, thereby shorting the circuit.

Figure 7:
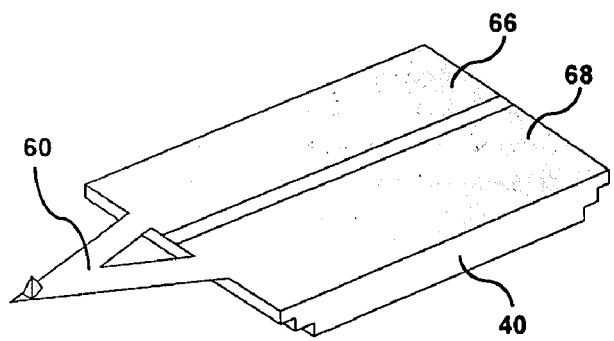
FIG. 7 is a perspective view illustrating the probe with integrated circuit embodying the invention described herein.

FIG. 7 illustrates an AFM probe whose circuit path, 66 to 60 to 68, or the reverse, starts on one part of the handle, extends out over the cantilever, and terminates back on a different part of the handle. The probe thus incorporates a circuit with two terminals formed on the handle for inputs or outputs to the cantilever. No direct lithography step was necessary to form this circuit. It was formed with only one process step, an orthogonal line-of-sight deposition step, on a probe with the desirable surface topography.

Alternatively, the borosilicate glass block 40 can also have a recess formed into its surface topography such that the two thin film handle-mounts 26 and 28 overhang the sidewalls of the recessed area. This will create a sidewall profile that will substantially preclude further prevent the deposited circuit material from shorting across the handle.

Figure 8A:
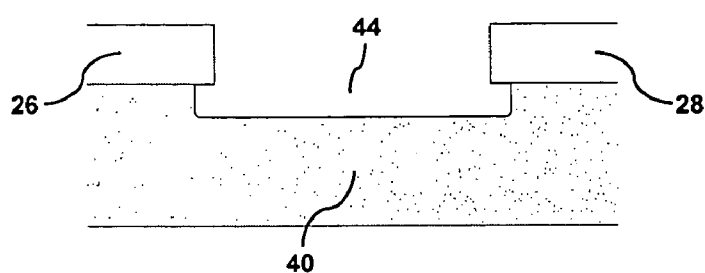
FIG. 8 is a cross-sectional view of an alternative embodiment of the invention disclosed herein.
Figure 8B:
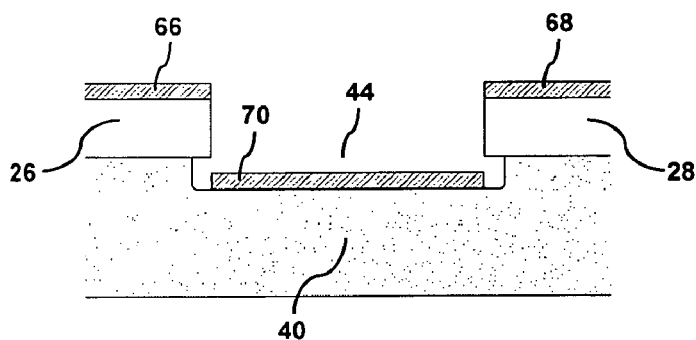

FIG. 8A illustrates the alternative embodiment, a probe handle that has a different cross-sectional profile, a profile which substantially precludes the circuit material from shorting across the handle. The glass block 40 may have a recess 44 formed into its surface topography via standard semiconductor lithography processes, including the use of a wet etchant (e.g. $H_2O/HNO_3/HF$ mixture) or even a reactive ion etch. The recessed pattern is such that the thin film handle-mounts 26 and 28 overhang the sidewalls of the recess 44 in the glass block 40 after the bonding step. FIG. 8B shows the cross-section of the completed probe handle after the circuit material 66, 68, 70 has been deposited with the line-of-sight technique.

What is claimed is:

1. A probe for a probe-based instrument, comprising:
   a) a cantilever,
   b) a first handle mount,
   c) a second handle mount that is separated from the first handle mount by a space,
   d) a handle having a first side attached to a second side of the first and the second handle mounts, and
   e) an electrical circuit loop formed by a circuit layer that is deposited on a first side of the first handle mount, a first side of the cantilever, a first side of the second handle mount and on a portion of the handle exposed in the space between the first and the second handle mounts such that a portion of the circuit layer located on the handle does not contact a portion of the circuit layer located on the first and the second handle mounts and is not part of the electrical current loop.

2. The probe of claim 1, wherein the cantilever comprises a first leg that is connected to the first handle mount, and a second leg that is connected to the second handle mount.

3. The probe of claim 1, wherein the circuit layer comprises gold and the cantilever comprises silicon nitride.

4. The probe of claim 1, wherein the cantilever further comprises a tip located on the first side of the cantilever.

5. The probe of claim 1, wherein a thickness of the handle under the space between the first and the second handle mounts is less than a thickness of the handle under the first and the second handle mounts.

6. The probe of claim 1, wherein the first side of the handle has a recess area, such that a portion of the second side of the first handle mount and a portion of the second side of the second handle mount overhang sidewalls of the recess area.

7. The probe of claim 1, wherein the probe does not comprise a piezoelectric actuator.

8. The probe of claim 1, further comprising a reflective layer on a second side of the cantilever.

9. A method of making a probe for a probe-based instrument, comprising:
   (A) providing a probe structure, comprising:
      a) a cantilever,
      b) a first handle mount,
      c) a second handle mount that is separated from the first handle mount by a space, and
      d) a handle having a first side attached to a second side of the first and the second handle mounts, and
   (B) depositing a circuit layer on a first side of the first handle mount, a first side of the cantilever, a first side of the second handle mount and on a portion of the handle exposed in the space between the first and the second handle mounts to form an electrical circuit loop, wherein a portion of the circuit layer located on the handle does not contact a portion of the circuit layer located on the first and second handle mounts and is not part of the electrical current loop.

10. The method of claim 9, wherein said providing the cantilever of the probe structure further comprises a tip on the first side of the cantilever.

11. The method of claim 10, wherein said providing the probe structure comprises:
   i) providing a substrate,
   ii) forming an inverted tip into the substrate,
   iii) depositing a thin film, which includes the cantilever and the first and second handle mounts, on the substrate over the inverted tip,
   iv) attaching the handle to the first and the second handle mounts, and v) removing the substrate from the thin film to expose the cantilever and the first and the second handle mounts attached to the handle.

12. The method of claim 11, wherein the thin film comprises silicon nitride.

13. The method of claim 11, wherein the step of attaching comprises anodically bonding the handle to the first and the second handle mounts.

14. The method of claim 9, wherein the handle has a recessed area below the space and each of the first and the second handle mounts overhangs a portion of the recessed area.

15. The method of claim 9, wherein said circuit layer comprises gold.

16. The method of claim 9, further comprising depositing a reflective layer on a second side of the cantilever.

17. The method of claim 9, wherein said depositing does not comprise lithographic patterning of the circuit layer.

18. A method of using a probe-based instrument, comprising:
    providing a probe, comprising:
    a) a cantilever,
    b) a first handle mount,
    c) a second handle mount that is separated from the first handle mount by a space,
    d) a handle having a first side attached to a second side of the first and the second handle mounts, and
    e) an electrical circuit loop formed by a circuit layer that is deposited on a first side of the first handle mount, a first side of the cantilever, a first side of the second handle mount and on a portion of the handle exposed in the space between the first and the second handle mounts such that a portion of the circuit layer located on the handle does not contact a portion of the circuit layer located on the first and the second handle mounts and is not part of the electrical current loop, and actuating the cantilever by providing electrical current through the electrical circuit loop.

19. The method of claim 18, wherein said actuating utilizes thermal mechanical forces or magnetic forces in the circuit loop.

20. The method of claim 18, wherein said probe does not comprise a piezo-electric actuator.

21. The method of claim 18, wherein the probe based instrument is an atomic force microscope.

22. The method of claim 21, wherein said actuating is performed in an AC mode of the atomic force microscope.

23. The method of claim 18, wherein the cantilever comprises silicon nitride and the circuit layer comprises gold.

24. The method of claim 18, wherein the cantilever further comprises a tip on the first side of the cantilever.

25. The method of claim 18, wherein the cantilever comprises a first leg that is connected to the first handle mount, and a second leg that is connected to the second handle mount.

26. The method of claim 18, further comprising sensing a mechanical response of said cantilever using the circuit loop.

* * * * *